United States Patent [19]
Mills et al.

[11] Patent Number: 5,748,920
[45] Date of Patent: May 5, 1998

[54] TRANSACTION QUEUE IN A GRAPHICS CONTROLLER CHIP

[75] Inventors: Karl Scott Mills, Lynnwood; Lauren Emory Linstad, Renton, both of Wash.; Sherwood Brannon, Fremont, Calif.; Mark Emil Bonnelycke; Richard Charles Andrew Owen, both of Seattle, Wash.

[73] Assignee: Cirrus Logic, Inc., Fremont, Calif.

[21] Appl. No.: 536,689

[22] Filed: Sep. 29, 1995

Related U.S. Application Data

[60] Provisional application No. 60/000,492, Jun. 23, 1995.
[51] Int. Cl.[6] .................................................. G06F 13/00
[52] U.S. Cl. .......................... 395/308; 395/309; 395/310
[58] Field of Search .................................. 395/308, 309, 395/281, 286

[56] References Cited

U.S. PATENT DOCUMENTS

| | | | |
|---|---|---|---|
| 5,469,544 | 11/1995 | Aatresh et al. | 395/290 |
| 5,469,558 | 11/1995 | Lieberman et al. | 395/285 |
| 5,471,637 | 11/1995 | Pawlowski | 395/296 |
| 5,499,385 | 3/1996 | Farmwald et al. | 395/823 |
| 5,553,262 | 9/1996 | Ishida et al. | 395/450 |

*Primary Examiner*—Jack B. Harvey
*Assistant Examiner*—David A. Wiley
*Attorney, Agent, or Firm*—Roger W. Blakely, Jr.; Steven A. Shaw

[57] ABSTRACT

A transaction queue for transferring data between a host bus and an internal system bus within a graphics controller is disclosed. The queue comprises a First In First Out (FIFO) memory having independent clocks for reading and writing. The queue accommodates address information, data, command information, byte enable information, decode information, and a tag. The tag is a 2 bit field used to identify the queued entries as address, last data, and burst data. In a preferred embodiment, single transactions are written to the queue with no wait states. In the case of an address entry, the address associated with the transaction is stored in the queue along with the command and decode information. A tag is also included that identifies the entry as an address. In the case of a final data entry, the data is stored in the next entry along with the byte enable information and a tag to indicate it is the last data of the transaction. In the case of a burst, the address entry is followed by multiple data entries that are each tagged as burst data. The final data entry of the burst will be tagged as the last data of the transaction in the same way as the data of a single transaction.

20 Claims, 5 Drawing Sheets

| Address/ Data | D3.1 | A3.1 | D2.3 | D2.2 | D2.1 | A2.1 | D1.1 | A1.1 |
|---|---|---|---|---|---|---|---|---|
| Command/ Byte Enables | B3.1 | C3.1 | B2.3 | B2.2 | B2.1 | C2.1 | B1.1 | C1.1 |
| Select | X | S3.1 | X | X | X | S2.1 | X | S1.1 |
| Tag | 10 | 11 | 10 | 00 | 00 | 11 | 10 | 11 |
| FIFO Location | 7 | 6 | 5 | 4 | 3 | 2 | 1 | 0 |

*Figure 4b*

TRANSACTION QUEUE IN A GRAPHICS CONTROLLER CHIP

CROSS-REFERENCE TO RELATED APPLICATIONS

This application claims benefit of U.S. Provisional application Ser. No. 60/000,492 filed Jun. 23, 1995.

BACKGROUND OF THE INVENTION

1. Field of the Invention

The present invention relates to computer systems, and more particularly, to the efficient transfer of data from a host bus to an internal processor bus in a computer system.

2. Description of the Related Art

The PCI bus utilizes address/data multiplexing and zero wait state burst capability to achieve high throughput across a compact interface. The address and data are multiplexed on a 32-bit path, and the command information (read, write, memory, I/O, configuration, etc.) is multiplexed with the byte enables on a 4-bit path. An unlimited amount of data can be bursted, with new data and byte enable information being presented on each clock cycle.

A graphics controller is composed of several separate modules that require access to the PCI bus. In particular controllers, these modules all run on a 62.5 MHz internal system clock, as opposed to the 33 MHz PCI bus clock. Some of the modules require burst data, while others require single transactions. The challenge is to synchronize the transactions across the two clock domains, and at the same time allow zero wait state performance on the PCI bus for both single and burst transactions, all while making efficient use of the temporary storage at the interface so as to minimize the on chip interface storage capacity required.

One conventional approach to this problem is the utilization of an interface circuit utilizing two First In First Out (FIFO) buffers; one for receiving data, and the other for receiving corresponding addresses and commands, as shown in FIG. 1. This conventional interface circuit requires separate address and data FIFOs, and additional multiplexer logic. Such an approach is inefficient because extra storage space is required when separate address and data FIFOS are needed. In addition, the requirement of more complex logic for multiplexing and demultiplexing operations also adds to the requirement of additional storage space. Furthermore, certain types of data, such as burst data, do not utilize address identification. Thus, in an interface circuit which accommodates burst data, there is no need for the use of separate address and data FIFOS.

An alternate scheme that is more complex and requires more hardware is illustrated in FIG. 2. This alternate scheme utilizes a FIFO to accommodate address and data information, command and byte enable information and select information. It divides the bursts into single transactions, which must be stored in a deep FIFO, such as a 10 entry and 40-bit wide FIFO as shown. However, this approach is also inefficient because it is limited to the transfer of single transactions. In addition, it is also inefficient because for every transaction, an address must be followed by the associated data, resulting in inefficient use of the FIFO.

Accordingly, there is a need in the technology for a method and apparatus for transferring data from a host bus to a bus within the processor which facilitates the efficient transfer of either burst or non burst transactions and which also facilitates the operation of the processor at optimal speed.

BRIEF SUMMARY OF THE INVENTION

A transaction queue for transferring data between a host bus and an internal system bus within a graphics controller is disclosed. The queue comprises a First In First Out (FIFO) memory having independent clocks for reading and writing. The queue accommodates address information, data, command information, byte enable information, decode information, and a tag. The tag is a 2 bit field used to identify the queued entries as address, last data, and burst data. In a preferred embodiment, single transactions are written to the queue with no wait states. In the case of an address entry, the address associated with the transaction is stored in the queue along with the command and decode information. A tag is also included that identifies the entry as an address. In the case of a final data entry, the data is stored in the next entry along with the byte enable information and a tag to indicate it is the last data of the transaction. In the case of a burst, the address entry is followed by multiple data entries that are each tagged as burst data. The final data entry of the burst will be tagged as the last data of the transaction in the same way as the data of a single transaction.

BRIEF DESCRIPTION OF THE DRAWINGS

FIG. 4B is a table of exemplary values stored in FIFO 18 of FIG. 4A for several transactions, illustrating the operation of the Transaction Queue Circuit 12 of FIG. 4A.

DETAILED DESCRIPTION OF THE INVENTION

Figure 3:
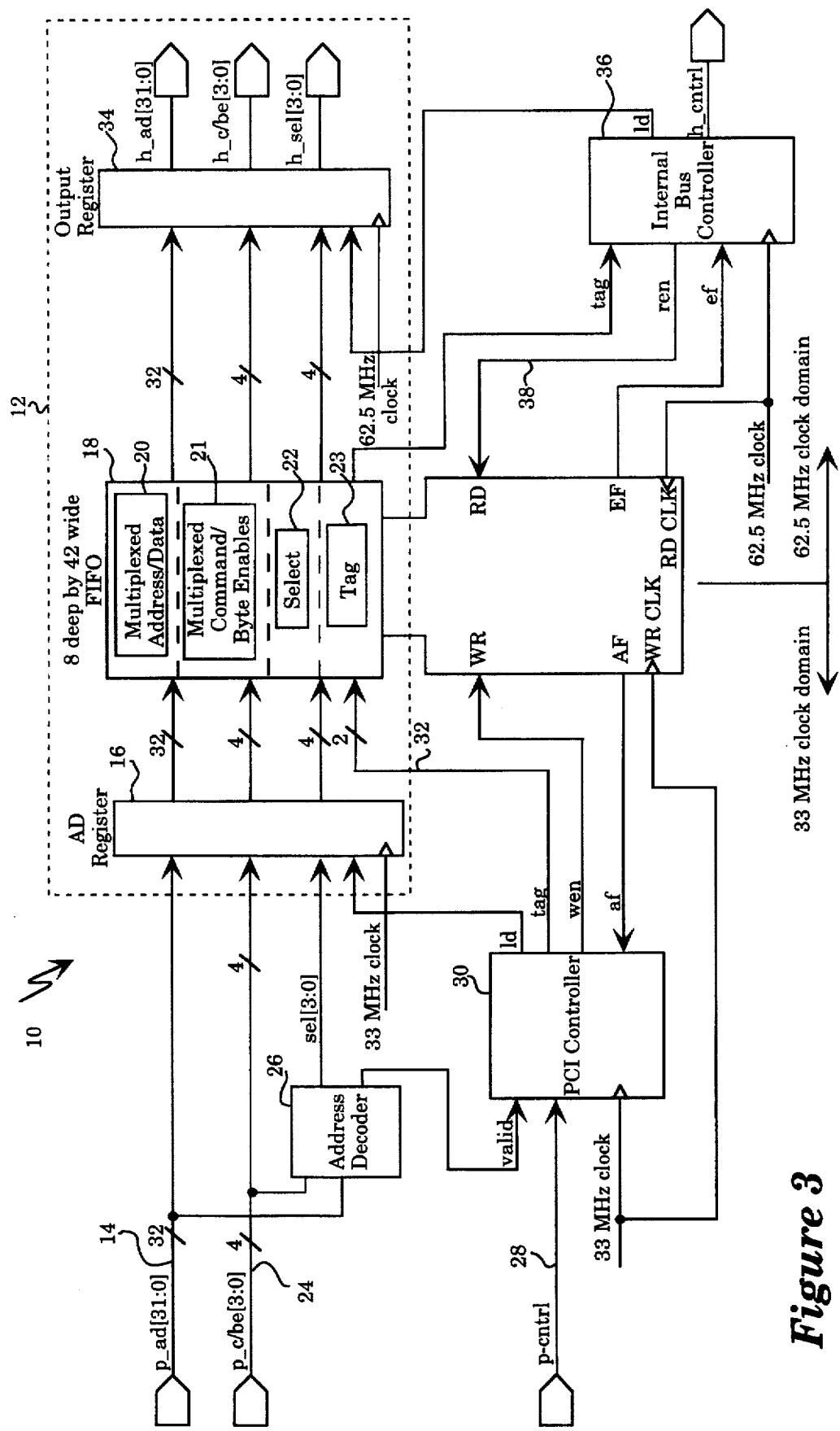
FIG. 3 is a system block diagram illustrating an exemplary host interface circuit in a graphics controller utilizing a preferred embodiment of the Transaction Queue Circuit of the present invention.

FIG. 3 is a system block diagram illustrating an exemplary host interface circuit 10 within a graphics controller which utilizes a preferred embodiment of the Transaction Queue Circuit 12 of the present invention. The host interface circuit 10 is implemented around two internal busses: an internal host bus and an internal memory bus. The internal host bus is connected to an external host bus through a host interface module and the internal memory bus is connected to a Random Access Memory bus ("Rambus") channel through a Rambus Interface Access Channel. The internal memory bus is also accessible by modules external to the host interface circuit 10 such as a video graphics adapter module or a direct frame buffer module. The host interface circuit 10 synchronizes the host clock, which in the present example is a 33 MHz clock signal, to the internal system clock, which in the present case is a 62.5 MHz clock signal.

The Transaction Queue Circuit 12 comprises a First In First Out (FIFO) buffer 18 which receives data via an Address/Data Register 16 and provides data to an Output Register 34. The Transaction Queue Circuit 12 is also coupled to the host and the internal system clocks for writing and reading, respectively. In a preferred embodiment, the FIFO 18 is 8 entries deep by 42 bits wide. A PCI Controller 30 writes to the FIFO 18 on the rising edge of the host clock. The FIFO 18 is read by an Internal Bus Controller 36 on the rising edge of the internal system clock. The Transaction Queue Circuit 12 accommodates address information and data 20, command and byte enable information 21, select information 22 and a tag value 23. The tag value 23 is provided in a 2 bit field used to identify the queued entries as either an address, the last data or burst data, as will be described in detail below. The FIFO 18 provides the temporary storage required to allow both busses to effectively run with zero wait states. For example, though the internal host bus can transfer data almost twice as fast as the PCI bus, the Transaction Queue Circuit 12 provides the temporary storage for the host PCI data that gets transferred before the internal host bus burst actually begins. As a result, transactions between the two busses can be provided without any waiting.

The Transaction Queue Circuit 12 also synchronizes write cycles between the two clock domains. Host accesses to registers internal to the host interface circuit 10 on the graphics controller do not go through the Transaction Queue Circuit 12 and can occur concurrently with queued graphics controller resource accesses. The Transaction Queue Circuit 12 allows host write transactions, including multiple data phase bursts, to occur at full speed on the external host bus, while providing transaction information to the graphics controller resources on the internal host bus running at the system clock rate. Information read from the FIFO 18 of the Transaction Queue Circuit 12 is passed to an Output Register 34, where data is held during the internal host bus transaction.

Multiplexed address and data 20 are provided via the external host bus to signal line 14, registered with Address/Data Register 16 and then connected to 32 bits of the FIFO 18. Multiplexed command and byte enable information 21 provided via the external host bus to signal line 24, registered with Address/Data Register 16 and then connected to 4 bits of the FIFO 18. The select information 22 originates from an Address/Command Decoder 26, which also receives the multiplexed address and data via signal line 14, as well as the multiplexed command and byte enable information provided on signal line 24. The output of the Decoder 26 is registered with Address/Data Register 16 and then connected to 4 bits of the FIFO 18. Control data is provided via the external host bus to signal line 28, which in turn provides the control data to PCI Controller 30.

The PCI Controller 30 also receives a signal from Decoder 26 which indicates whether the data the Decoder 26 received on signal lines 14 and 24 are valid. In addition, the PCI Controller 30 receives the same clock signal as used by the external host bus, which in the present example is a 33 MHz clock signal. In response, the PCI Controller 30 generates a tag value 23 via signal line 32 according to whether it is currently loading an address (11b [binary]), burst data (00b [binary]), or last data (10b [binary]), as will be discussed in detail in the following sections. Signal line 32 is connected to 2 bits of the FIFO 18.

The Output Register 34 receives address information and data 20, command and byte enable information 21 and select information 22 from the FIFO 18. This information 20–22 is held in the Output Register 34 and driven onto the internal host bus during transactions. In a preferred embodiment, the Output Register 34 has 36 bits for address information and data 20, 4 bits for the command and byte enable information 21, and 4 bits for the select information 22.

Figure 4A:
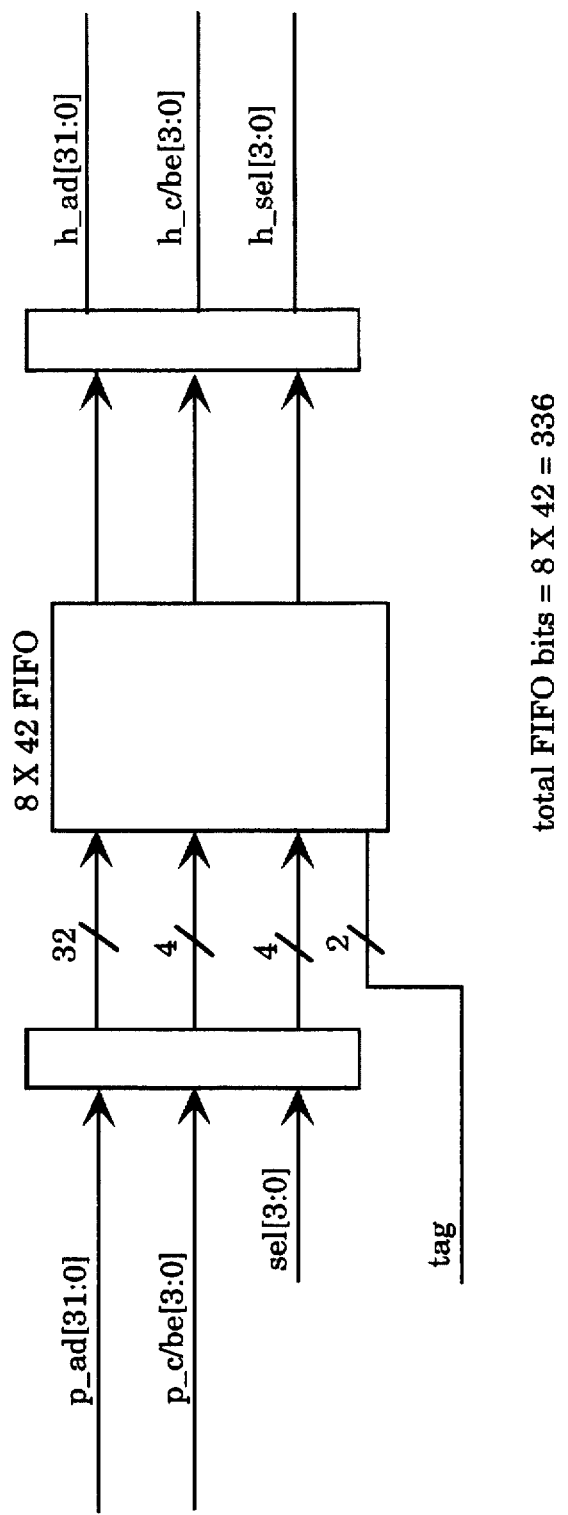
FIG. 4A is a block diagram illustrating the preferred embodiment of the Transaction Queue Circuit 12 of FIG. 3.

Examples of the operation of the Transaction Queue Circuit 12 will now be discussed in conjunction with FIGS. 4A and 4B. FIG. 4A is a block diagram illustrating the preferred embodiment of the Transaction Queue Circuit 12 of the present invention. FIG. 4B is a table illustrating examples of several transactions. Information 20–22 is read from the Transaction Queue Circuit 12 as controlled by the Internal Bus Controller 36 via signal line 38 when an empty flag ("EF") is deasserted. The multiplexed address and data 20, multiplexed command and byte enable information 21 and select information 22 are provided to Output Register 34 and the tag value 23 is provided to the Internal Bus Controller 36.

As each entry is read, the Internal Bus Controller 36 uses the tag value 23 to determine the type of information read. As shown in FIG. 4B, the first entry (0) is read and found to contain address (A1.1), command (C1.1), select (S1.1), and a tag value of 11b. The Internal Bus Controller 36 identifies this as address phase information and will store it in the Output Register 34. The next entry (1) will be read from the FIFO 18 and the tag value 23 will be examined. In this example, the tag value 23 is 10b, which signifies the last data of the transaction. The Internal Bus Controller 36 will begin a single transaction on the internal bus using the address (A1.1), command (C1.1), and select (S1.1) previously stored in the Output Register 34. The data (D1.1) and byte enable information 21 (B1.1) from the FIFO 18 will be loaded into the Output Register 34 on the next clock to be used during the data phase. This would complete the first transaction, and the Internal Bus Controller 36 would then continue by reading the next entry of the FIFO 18.

The next entry (2) contains a new address (A2.1), command (C2.1), select (S2.1) and an address tag (11b). The information will be again stored in the Output Register 34 while the next entry (3) is read. Entry 3 contains a tag value 23 of 00b which indicates it contains burst data (D2.1) and corresponding byte enable information (B2.1). The Internal Bus Controller 36 will begin a burst transaction using the previously stored address (A2.1), command (C2.1), select (S2.1) information obtained during the address phase. The data (D2.1) and byte enable information 21 (B2.1) will be used on the next clock for the data phase, and the Internal Bus Controller 36 will read the next entry (4) from the FIFO 18. The tag value 23 of 00b indicates there is more burst data (D2.2) and byte enable information (B2.2), which will be loaded into the Output Register 34 and the burst transaction will continue. The next entry (5) is read and the tag value 23 of 10b indicates that this is the last data of the transaction. The data (D2.3) and byte enable information 21 (B2.3) will be used during the final data phase and the burst transaction is complete. The final two entries indicate a single transaction which will be processed by the Internal Bus Controller 36 in the same way as described above.

Figure 1:
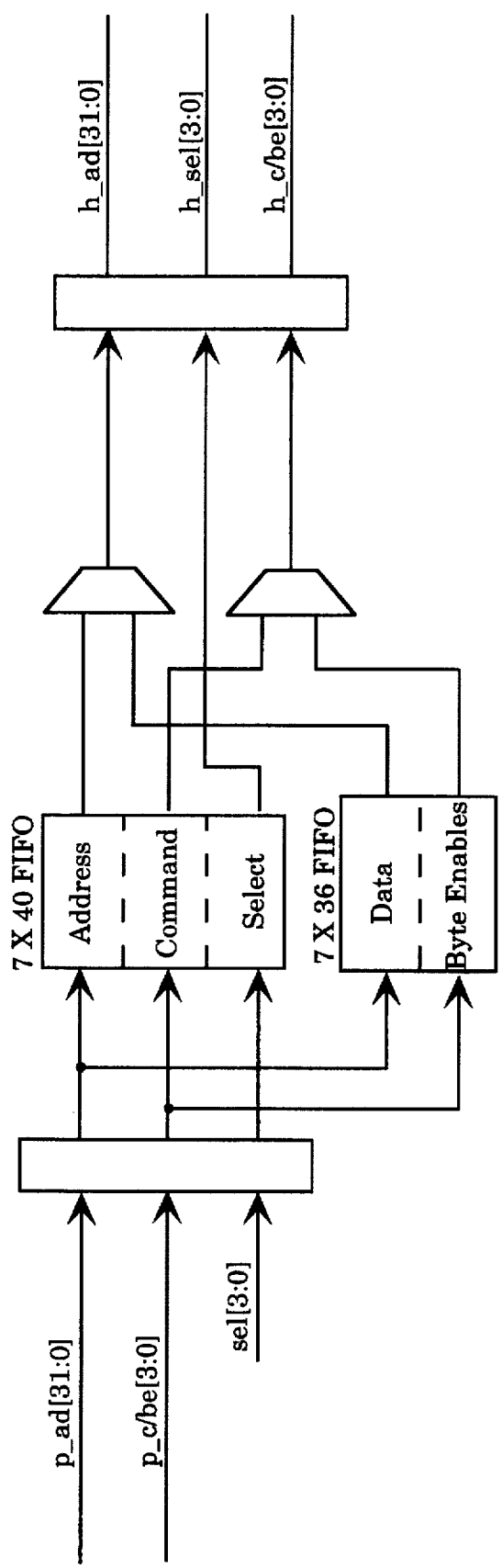
FIG. 1 is a block diagram of a conventional transaction queue circuit.
Figure 2:
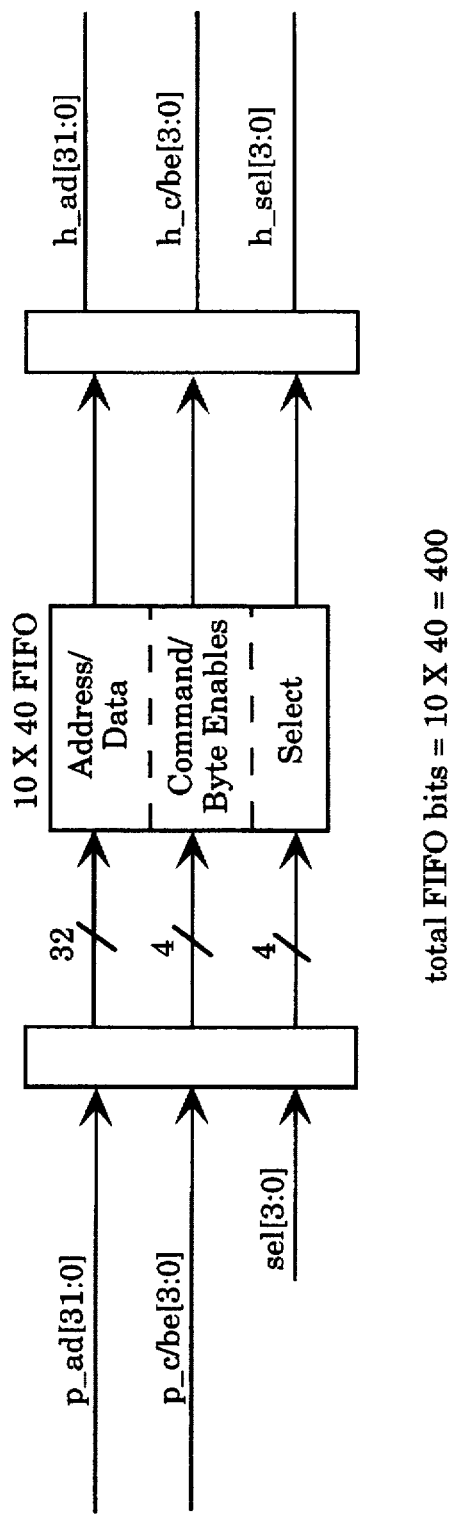
FIG. 2 is a block diagram of another conventional transaction queue circuit.

The present invention provides an efficient use of hardware because it accommodates multiplexed information directly from the PCI bus. The present invention, which utilizes a tagged scheme, is advantageous over non-tagged schemes such as that shown in FIGS. 1 and 2 as it requires fewer FIFO bits, less complex control logic, and works well with the multiplexed PCI bus. In addition, the present invention facilitates the operation of the processor at optimal speed. The combination of address and data tags as provided by the present invention also allows data transactions to be generated on the internal bus in a burst or non-burst manner, depending on the corresponding PCI transaction.

Modifications and variations of the embodiments described above may be made by those skilled in the technology while remaining within the true scope and spirit of this invention. For instance, the present invention may be implemented in any computer system requiring the coordination of data transfer between two busses and is not restricted to data transfer or data transmission between a host bus and a bus internal to the processor.

Thus, although the present invention has been described in terms of certain preferred embodiments, other embodiments that will be apparent to those of ordinary skill in the technology are also within the scope of this invention. Accordingly, the scope of the invention is intended to be defined only by the claims which follow.

What is claimed is:

1. A circuit for transferring data between a host bus and an internal system bus, comprising:
   a FIFO buffer coupled to receive a data entry including a tag value which indicates a data entry type, the FIFO buffer being responsive to a first clock signal for receiving the data entry;
   an output register coupled to the FIFO buffer for receiving the data entry from the FIFO buffer; and
   a bus controller for receiving the tag value from the FIFO buffer, the FIFO buffer providing the tag value to the bus controller in response to a second clock signal, wherein the bus controller causes the data entry to be written to the output register during a next cycle of the second clock signal, and wherein the output register dispatches the data entry in response to the bus controller.

2. The circuit of claim 1, wherein the data entry includes multiplexed address and data, multiplexed command and byte enable information and select information.

3. The circuit of claim 1, wherein the first clock signal is a host clock signal and the second clock signal is an internal system clock signal.

4. The circuit of claim 1, wherein the data entry type is selected from the group consisting of: an address, a last data or a burst data.

5. The circuit of claim 1, further comprising:
   an internal host bus for receiving the data entry;
   a register coupled to the internal host bus and the FIFO buffer for receiving the data entry; and
   an internal host bus controller coupled to the internal host bus for receiving control information, the internal host bus controller also coupled to the register for providing the tag value to the FIFO buffer, the register being responsive to the internal host bus controller for receiving the data entry.

6. The circuit of claim 5, wherein the internal host bus controller is responsive to the second clock signal.

7. The circuit of claim 5, wherein the register is responsive to the second clock signal.

8. A method of transferring data between a host bus and an internal system bus, comprising the steps of:
   providing a data entry including a tag value which indicates a data entry type to a FIFO buffer, the FIFO buffer being responsive to a first clock signal for receiving the data entry;
   providing the data entry from the FIFO buffer to an output register coupled to the FIFO buffer;
   providing the tag value from the FIFO buffer to a bus controller in response to a second clock signal;
   providing the data entry from the FIFO buffer to the output register during a next cycle of the second clock signal; and
   dispatching the data entry from the output register in response to the data entry type.

9. The method of claim 8, wherein in the step of providing a data entry, the data entry includes multiplexed address and data, multiplexed command and byte enable information and select information.

10. The method of claim 8, wherein in the step of providing a data entry, the first clock signal is a host clock signal and wherein in the steps of providing the tag value and providing the data entry from the FIFO buffer to the output register, the second clock signal is an internal system clock signal.

11. The method of claim 8, wherein in the step of providing a data entry, the data entry type is selected from the group consisting of: an address, a last data or a burst data.

12. The method of claim 8, further comprising the steps of:
   providing a register coupled to an internal host bus and the FIFO buffer for receiving the data entry; and
   providing an internal host bus controller coupled to the internal host bus for receiving control information, the internal host bus controller also coupled to the register for providing the tag value to the FIFO buffer, the register being responsive to the internal host bus controller for receiving the data entry, wherein the providing steps occur prior to the step of providing a data entry including a tag value.

13. The method of claim 12, wherein in the step of providing an internal host bus controller, the internal host bus controller is responsive to the second clock signal.

14. An apparatus for transferring data between a host bus and an internal system bus, comprising:
   an internal host bus for providing data entries;
   a transaction queue circuit coupled to the internal host bus, comprising:
      a FIFO buffer coupled to the internal host bus for receiving a data entry including a tag value which indicates a data entry type, the FIFO buffer being responsive to a first clock signal for receiving the data entry;
      an output register coupled to the FIFO buffer for receiving the data entry from the FIFO buffer;
      a bus controller for receiving the tag value from the FIFO buffer, the FIFO buffer providing the tag value to the bus controller in response to a second clock signal, wherein the bus controller provides the data entry to the output register during a next cycle of the second clock signal, and wherein the output register dispatches the data entry in response to the bus controller; and
   an internal system bus coupled to the bus controller for receiving the dispatched data entry.

15. The apparatus of claim 14, wherein the data entry includes multiplexed address and data, multiplexed command and byte enable information and select information.

16. The apparatus of claim 14, wherein the first clock signal is a host clock signal and the second clock signal is an internal system clock signal.

17. The apparatus of claim 14, wherein the data entry type is selected from the group consisting of: an address, a last data or a burst data.

18. The apparatus of claim 14, further comprising:
   a register coupled to the internal host bus and the FIFO buffer for receiving the data entry; and
   an internal host bus controller coupled to the internal host bus for receiving control information, the internal host bus controller also coupled to the register for providing the tag value to the FIFO buffer, the register being responsive to the internal host bus controller for receiving the data entry.

19. The circuit of claim 18, wherein the internal host bus controller is responsive to the second clock signal.

20. The circuit of claim 18, wherein the register is responsive to the second clock signal.

* * * * *